(12) United States Patent
Cisar et al.

(10) Patent No.: US 6,838,205 B2
(45) Date of Patent: Jan. 4, 2005

(54) BIFUNCTIONAL CATALYTIC ELECTRODE (75) Inventors: Alan Cisar, Cypress, TX (US); Oliver J. Murphy, Bryan, TX (US); Eric Clarke, Bryan, TX (US)

(73) Assignee: Lynntech, Inc., College Station, TX (US)

( * ) Notice: Subject to any disclaimer, the term of this patent is extended or adjusted under 35 U.S.C. 154(b) by 0 days.

(21) Appl. No.: 09/974,190

(22) Filed: Oct. 10, 2001

(65) Prior Publication Data

US 2003/0068544 A1 Apr. 10, 2003

(51) Int. Cl.$^7$ ................................................. H01M 4/96
(52) U.S. Cl. ............................. 429/40; 429/12; 429/32; 429/33
(58) Field of Search ............................. 429/12, 32, 33, 429/40

(56) References Cited

U.S. PATENT DOCUMENTS

| | | | |
|---|---|---|---|
| 3,981,745 A | | 9/1976 | Stedman |
| 3,992,271 A | | 11/1976 | Danzig et al. |
| 4,581,116 A | | 4/1986 | Plowman et al. |
| 4,804,592 A | | 2/1989 | Vanderborgh et al. |
| 5,306,577 A | | 4/1994 | Sprouse |
| 5,409,785 A | * | 4/1995 | Nakano et al. ................ 429/33 |
| 5,538,608 A | * | 7/1996 | Furuya ........................ 204/282 |
| 5,635,039 A | | 6/1997 | Cisar et al. |
| 6,042,959 A | * | 3/2000 | Debe et al. .................... 429/33 |
| 6,054,228 A | | 4/2000 | Cisar et al. |
| 6,083,638 A | | 7/2000 | Taniguchi et al. |
| 6,117,579 A | | 9/2000 | Gyoten et al. |
| 6,123,816 A | * | 9/2000 | Hodgson ..................... 205/620 |
| 2002/0192537 A1 | * | 12/2002 | Ren ............................. 429/44 |
| 2003/0022055 A1 | * | 1/2003 | Menashi ....................... 429/44 |
| 2003/0037798 A1 | * | 2/2003 | Baillie et al. ............... 132/321 |

FOREIGN PATENT DOCUMENTS

| | | |
|---|---|---|
| EP | 0472922 A2 | 4/1992 |
| EP | WO/02/49136 A2 | 6/2002 |
| JP | 62154571 | 9/1987 |
| JP | 2000342965 | 12/2000 |
| WO | WO/01/15247 A2 | 3/2001 |

OTHER PUBLICATIONS

B.D. Cullity, "Elements of X–Ray Diffraction," Addison–Wesley Publishing Co. (1978).*

National Science Foundation website.*

T. Ioroi et al. "Iridium Oxide/Platinum Electrocatalysts for Unitized Regenerative Polymer Electrolyte Fuel Cells," J. Electrochemical Society, 147(6), 2018–2022 (2000).*

Z. Shao et al. "Bifunctional Electrodes with a Thin Catalyst Layer for 'Unitized' Proton Exchange Membrane Regenerative Fuel Cell, " J. Power Sources 79, 82–85 (1999).*

Journal of Applied Electrochemistry 31: 1179–1183, 2001, 2001 Kluwer Academic Publishers, Printed in the Netherlands. Authors: T Ioroi, et, al.

International Search Report; 7 pages; International Application No. PCT/US/02/32409; International Filing Date Sep. 10, 2002.

* cited by examiner

Primary Examiner—Dah-Wei Yuan
(74) Attorney, Agent, or Firm—Streets & Steele; Jeffrey L. Streets; Frank J. Campigotto (57) ABSTRACT

The present invention relates to an oxygen electrode for a unitized regenerative hydrogen-oxygen fuel cell and the unitized regenerative fuel cell having the oxygen electrode. The oxygen electrode contains components electrocatalytically active for the evolution of oxygen from water and the reduction of oxygen to water, and has a structure that supports the flow of both water and gases between the catalytically active surface and a flow field or electrode chamber for bulk flow of the fluids. The electrode has an electrocatalyst layer and a diffusion backing layer interspersed with hydrophilic and hydrophobic regions. The diffusion backing layer consists of a metal core having gas diffusion structures bonded to the metal core.

52 Claims, 5 Drawing Sheets

BIFUNCTIONAL CATALYTIC ELECTRODE

This invention was made with the government support under contract NAS4-00012 awarded by NASA. The government has certain rights in this invention.

FIELD OF THE INVENTION

The present invention relates to a composite oxygen electrode for use in electrochemical cells. More specifically, the present invention relates to a composite oxygen electrode for use in unitized regenerative hydrogen-oxygen fuel cells.

BACKGROUND OF THE INVENTION

Electrochemical cells in which a chemical reaction is forced by adding electrical energy are called electrolytic cells. Central to the operation of any cell is the occurrence of oxidation and reduction reactions that produce or consume electrons. These reactions take place at electrode/solution or electrode/gas phase interfaces, where the electrodes must be good electronic conductors. In operation, a cell is connected to an external load or to an external voltage source, and electrons transfer electric charge between the anode and the cathode through the external circuit. To complete the electric circuit through the cell, an additional mechanism must exist for internal charge transfer. This is provided by one or more electrolytes, which support charge transfer by ionic conduction, but they must be poor electronic conductors to prevent internal short-circuiting of the cell. A proton exchange membrane is a solid electrolyte that can be placed between the electrodes for internal charge transfer. One proton exchange membrane is sold under the name NAFION, a trademark of E. I. duPont de Nemours and Company of Wilmington, Del.

The simplest electrochemical cell consists of at least two electrodes and one or more electrolytes. The electrode at which the electron producing oxidation reaction occurs is the anode. The electrode at which an electron consuming reduction reaction occurs is called the cathode. The direction of the electron flow in the external circuit is always from the anode to the cathode.

Hydrogen and oxygen can be produced by electrolyzing water in a proton exchange membrane electrolyzer. In a water electrolyzer, water is introduced to the anode side of the proton exchange membrane and oxidized at the electrode surface. This reaction produces gaseous oxygen, which can be stored, and protons that pass through the proton exchange membrane to the cathode side. The electrons that were freed by the oxidation reaction are conducted to the cathode side through an external circuit by applied potential. The electrons and the protons recombine at the cathode electrode generating hydrogen by proton reduction.

Electrochemical cells that convert chemical energy into electrical energy are called fuel cells and are, by their operation, the opposite of electrolyzer cells. Fuel cells react different gases on anode and cathode electrodes having electrocatalytic surfaces that are positioned on opposite sides of an ion exchange membrane. Generally, the gas introduced to the anode is categorized a fuel while the gas introduced to the cathode is an oxidant.

In a hydrogen-oxygen fuel cell using a solid electrolyte, hydrogen is introduced via a gaseous stream to the anode side of a proton exchange membrane and oxygen is introduced via a second gaseous stream to the cathode side of the proton exchange membrane. In the fuel cell, the oxygen stream is electrochemically reduced and the hydrogen stream is electrochemically oxidized, the combined reactions producing water. The protons generated at the anode cross through the proton exchange membrane to the cathode, where they react in the oxygen reduction reaction with the electrons generated at the anode, making water. The electrons generated in the anode compartment are collected by a current collector and transported through an external circuit, which contains a load, to the cathode compartment.

Combining the functions of the proton exchange membrane electrolyzer and the proton exchange membrane fuel cell in the same device is described as a unitized regenerative fuel cell. In one design for a unitized regenerative hydrogen-oxygen fuel cell, each electrode is always in contact with the same gas, hydrogen or oxygen, and the electrical polarization of the stack is reversed when the system changes functions. Therefore, if the unit is operating as an electrolyzer, the oxygen electrode is the anode and the hydrogen electrode is the cathode. If the unit is operating as a fuel cell, the oxygen electrode is the cathode and the hydrogen electrode is the anode. It is therefore important that both electrodes be fabricated so that they do not degrade when operated in an oxidizing mode.

There are two problems encountered in designing electrodes for unitized regenerative fuel cell systems. First, electrodes suitable for use as oxygen evolution need to be hydrophilic to insure the presence of water at the electrode surface, but this type of electrode will readily flood during fuel cell operation. Second, electrodes suitable for use as oxygen reducers need to be hydrophobic to insure the presence of oxygen at the electrode surface, but they limit water availability at the electrode surface during the electrolyzer operation. Several methods have been demonstrated for overcoming this problem by using specially designed electrodes with complex multi-layer structures or membranes with internal fluid passages. While these methods overcome the basic problems, neither of these approaches leads to a stack with adequate performance for this application.

An important part of the development of an oxygen electrode is the choice of electrocatalysts. It is well known that the best electrocatalyst for oxygen reduction, platinum in its reduced form, is not the best catalyst for water oxidation and oxygen evolution. Other effective oxygen reduction electrocatalysts, such as chelated iron and cobalt, have the same limitation. Iridium oxide evolves oxygen at a far lower over potential than platinum and most other noble metals, and therefore, when used as the electrocatalyst, iridium oxide increases the efficiency of an electrolyzer. Over potential is defined as the amount by which the potential required to evolve oxygen from water exceeds the potential required for the ideal reversible reaction, 1.48 Volts at 25° C. This problem can be addressed by mixing the two catalysts, for example, platinum black for oxygen reduction and iridium oxide for oxygen evolution.

Additionally, an effective electrode has each of the catalyst particles in contact with at least one other electronically conducting particle so that it has a continuous electronic path to the electrical conducting current collector. It also has a continuous ionic network linking each catalyst particle to the membrane. Some researchers have developed complex arrangements with a variable internal structure to achieve these properties. It would be an advantage for an electrode to have a simple arrangement, with the same gross composition used throughout the volume of the electrode, making it simpler to fabricate.

In addition to selecting an electrocatalyst during the development of an oxygen electrode, it is necessary to develop a porous, conductive diffusion backing behind the electrocatalyst to insure the even delivery of reactants to and removal of products from the entire area of the electrode and to insure continuous electrical contact between the current collecting structure and the electrode. In a conventional fuel cell, this function is commonly carried out with a porous carbon structure. These are not suitable for long term use with an oxygen electrode used as an electrolyzer of water. Under oxygen evolution conditions, when water is being oxidized to produce oxygen, the carbon is subject to oxidation. While the oxidation rate is low, if used continuously over a period of time, enough carbon will be consumed to reduce electrical contact with the catalyst and thereby impair the functioning of the cell.

There is a need for an improved oxygen electrode that supports both the oxidation of water and the reduction of oxygen reactions. There is an additional need for an oxygen electrode having an electrocatalytic surface having reduced internal electrical resistance that is easily constructed. There is also a need for a diffusion backing for the electrocatalyst that is both electrically conductive and resistant to oxidation.

SUMMARY OF THE INVENTION

The present invention provides an oxygen electrode for use in a unitized regenerative hydrogen-oxygen fuel cell. The electrode is comprised of an electrocatalytic layer and a gas diffusion backing layer. The electrocatalytic layer comprises an electrocatalyst mixture containing an electrocatalyst active for the evolution of oxygen, an electrocatalyst active for the reduction of oxygen and a binder. The gas diffusion backing provides a structure containing both hydrophilic regions and hydrophobic regions and ensures an adequate flow of reactants to and products from the electrocatalyst layer of the electrode. The gas diffusion backing structure preferably comprises a metal core and gas diffusion structures bonded to the metal core.

The electrocatalyst mixture comprises between 40 wt % and 70 wt % platinum black with the remainder of the mixture being a mixture of ruthenium-iridium oxides. Preferably, the electrocatalyst is a 60:40 (weight basis) mixture of platinum black and an equimolar ruthenium-iridium oxide solid solution. Alternatively, the ruthenium-iridium oxide solid solution may comprise between 5 mol % and 85 mol % ruthenium oxide with the remainder being iridium oxide. In still other alternatives, pure iridium oxide or iridium metal may be used, although these alternatives require larger amounts of the more costly iridium while offering little, if any, performance gain, or the iridium oxide may be in a solid solution with other metals such as titanium. For forming a solid solution, oxides such as, for example, $RuO_2$ and $TiO_2$, each having at least one crystalline form similar to the structure of $IrO_2$, are preferred. While a solid solution of the mixed oxides is optimal, optionally a simple mixture of the oxides may be used. The platinum black is active for the oxygen reduction reaction while the ruthenium-iridium oxide solid solution is active for the oxygen evolution reaction. The preferred binder for the electrocatalysts is a fluorinated ionomer and more preferably, a perfluorinated sulphonic acid polymer, such as NAFION. The quantity of binder can be between 30 vol % and 60 vol %, the remainder being the electrocatalyst mixture. The preferred quantity of binder is 40 vol %, the remainder being the electrocatalyst mixture.

The metal core of the gas diffusion backing provides both strength for the electrode structure as well as a continuous electrical contact between the current collecting structure and the electrodes. The metal core may comprise woven metal cloth, expanded metal sheets, perforated metal sheets or metal foam. The preferred metal core is gold plated titanium woven cloth.

The gas diffusion structures bonded to the metal core are made of an electrically conductive compound that is sufficiently stable to oxidation and hydrolysis. Examples of these compounds include early transition metal nitrides, some borides, and electronically conductive oxides. Preferably, the gas diffusion structures are a mixture of between 30 mol % and 90 mol % ruthenium oxide, the remainder being titanium oxides. More preferably 60:40 (molar basis) ruthenium-titanium oxides provides good conductivity and is resistant to oxidation under oxygen evolution conditions. The binders used to bind the gas diffusion structures to the metal core are preferably fluorinated polymeric binders, such as polytetrafluoroethylene or perfluorosulfonic acids.

The present invention further provides a unitized regenerative fuel cell comprising the oxygen electrode of the present invention, an electrically insulating polymer film capable of exchanging cations and a hydrogen electrode. Both electrocatalytic surfaces are in intimate contact with the cation exchange polymer film.

In the preferred embodiment, the hydrogen electrode is comprised of an electrocatalyst layer and a binder. The preferred electrocatalyst is platinum black with a fluorinated polymeric binder, preferably a fluorinated ionomer, such as NAFION.

BRIEF DESCRIPTION OF THE DRAWINGS

So that the features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The present invention provides a novel electrode structure suitable for use as an oxygen electrode in a unitized regenerative hydrogen-oxygen fuel cell. The electrode contains components electrocatalytically active for the evolution of oxygen from water and the reduction of oxygen to water and has a structure that supports the flow of both water and gases between the catalytically active surface and a flow field or electrode chamber for bulk flow of the fluids.

In the unitized regenerative hydrogen-oxygen fuel cell that is also part of the present invention, hydrogen and oxygen are produced by oxidizing water and stored during periods of low power demand until such time as extra power is needed. When power is needed, the polarization of the stack is reversed and the stored oxygen and hydrogen are reacted to produce water and electrical power.

Electrocatalysts useful for the oxygen reduction function and stable in oxygen evolution conditions includes ruthenium black, platinum, finely dispersed metallic platinum, and an alloy of platinum and ruthenium. The electrocatalyst selected for the preferred embodiment is a mixture of platinum black, for oxygen reduction, and equimolar ruthenium-iridium oxides for oxygen evolution. Alternatively, other oxygen reduction electrocatalysts can be used in substitution for, or in combination with, platinum. An important consideration is that the oxygen reduction electrocatalyst must be stable to degradation under oxygen evolution conditions while the unitized regenerative fuel cell is operating in the fuel cell mode.

Iridium oxide alone is an excellent electrocatalyst for oxygen evolution. Other alternative electrocatalysts for oxygen evolution include iridium oxide, dispersed metallic iridium, and a solid solution of iridium oxide and titanium oxide. However, the mix of ruthenium-iridium oxides in the preferred embodiment of the present invention provides three advantages over iridium oxide alone. First, the ruthenium oxide mix is less expensive and therefore reduces the overall cost of the blend of electrocatalysts. Second, since the ruthenium-iridium oxides mix includes iridium oxide to minimize the over potential for oxygen evolution and to actively support the oxygen evolution reaction, the use of the ruthenium-iridium oxide mix improves the utilization of the most expensive component with no loss of oxygen evolution activity. The third advantage is that ruthenium oxide is significantly more electronically conductive than iridium oxide, thereby improving the internal conductivity of the electrode and increasing the overall efficiency of the unitized regenerative hydrogen-oxygen fuel cell operation.

The mixture of platinum black with the ruthenium-iridium oxide solid solution in the preferred embodiment provides a blended electrocatalyst that is active for both the evolution of oxygen and the reduction of oxygen. Under fuel cell conditions when oxygen reduction is occurring, the platinum component will be active. The equimolar ruthenium-iridium oxides component will be inactive but will not interfere with the oxygen reduction reaction. Instead, it will function as a conductive diluent, much like the carbon in a carbon supported platinum catalyst. Under electrolyzer conditions, when oxygen evolution is occurring, both the platinum and the equimolar ruthenium-iridium oxides electrocatalysts will be active. Because the reversible oxygen evolution potentials for both the platinum and the equimolar ruthenium-iridium oxides electrocatalysts are below the operating potential, they will both contribute to oxygen evolution at any current density greater than the minimum current density required to observe gas evolution. Because the equimolar ruthenium-iridium oxides electrocatalyst has a lower over potential, leading to a lower operating potential, it will carry the bulk of the current. While a solid solution of the mixed oxides is optimal, optionally a simple mixture of the oxides may be used.

To successfully utilize the selected electrocatalysts of the oxygen electrode, a diffusion backing or layer behind the electrocatalysts is required to insure the even delivery of reactants and removal of products to and from the entire area of the electrode, and to insure continuous electrical contact between the current collecting structure and the electrode. The diffusion layer has a mixture of hydrophobic and hydrophilic regions. The hydrophilic regions insure sufficient delivery of water to the catalyst at the surface of the membrane to maintain membrane hydration when operating in the electrolyzer mode. The hydrophobic regions insure sufficient delivery of oxygen to the electrocatalyst for the oxygen reduction reaction to occur when operating in the fuel cell mode. These regions may vary in size over a wide range and the shapes of the regions may be either irregular or regular. The regions may be small, with dimensions in the micron range, or as large as a few millimeters, as long as all points are within about 1 mm of each a hydrophobic region and a hydrophilic region.

The diffusion backing must be both electrically conductive and resistant to oxidation. The diffusion backing could be just the metal core, but better results are achieved with the diffusion supports bonded to the metal core. In the preferred embodiment, the diffusion backing consists of a metal core with a layer of gas diffusion supports bonded to the metal core with a binder. The metal core provides strength as well as a continuous conductive matrix. The gas diffusion supports are made of an electrically conductive compound that is sufficiently stable to electrolysis and oxidation and, with the metal core, provides a continuous conductive matrix.

Useful metals for the metal core include titanium, zirconium, hafnium, niobium, tantalum and other valve metals. Oxidation resistant alloys are also useful, such as stainless steels, INCONELS and HASTELLOYS. INCONEL (predominately nickel and chromium, and containing varying percentages of iron, carbon, copper, manganese, iron, sulfur, silicon, aluminum, titanium, and cobalt) is a registered trademark of Special Metals Corporation of New Hartford, N.Y. HASTELLOY (predominately nickel and containing varying percentages of chromium, manganese, iron, copper, cobalt, titanium, aluminum, carbon, tungsten, and molybdenum) is a registered trademark of Haynes International, Inc., of Kokomo, Ind. Precious metals such as platinum, gold, ruthenium, iridium and palladium are also useful. Other metals and alloys such as nickel, aluminum and copper are useful as well, as long as they are protected from oxidation through the use of appropriate coatings. Titanium is especially suitable for the base material and gold plated woven titanium cloth mesh was found to be the most effective, largely due to the three dimensional nature of its woven structure. This woven structure furnishes channels for gas through the diffusion matrix of the electrode thereby improving the diffusion activity at the electrode as well as improving the internal conductivity. Alternative forms for the metal core could be woven metal cloth, perforated metal sheet, thin metal felts, expanded metal sheet and metal foam.

The gas diffusion supports bonded to the metal core are made of an electrically conductive compound that is sufficiently stable to oxidation and hydrolysis. A preferred electrically conductive compound is a mixture of ruthenium and titanium oxides. The mixture can range from between about 30 mol % and 90 mol % ruthenium oxide, the remainder being titanium oxide. In the preferred embodiment, a 60:40 (molar basis) mixture of ruthenium and titanium oxides was used. The 60:40 ruthenium-titanium oxides has good conductivity and is resistant to oxidation under oxygen evolution conditions. The 60:40 ruthenium-titanium oxides for the gas diffusion supports are preferably prepared by the classic nitrate fusion synthesis developed by Adams.

These electrically conductive compounds include: the early transition metal nitrides including, but not limited to, tantalum nitride, zirconium nitride, niobium nitride, and titanium nitride; some borides, such as titanium boride; electronically conductive oxides, such as ruthenium oxide; mixtures of oxides, such as titanium-ruthenium oxide ($Ti_x Ru_{(1-x)}O_2$); and carbides, such as titanium carbide. There are also well known classes of electronically conducting compounds that are unsuitable for the present invention because they are not stable with respect to oxidation or hydrolysis under the conditions present in a unitized regenerative fuel cell operating in the fuel cell mode. These unsuitable compounds include reduced chlorides, such as zirconium monochloride, and most reduced sulfides.

The binders used to bond the gas diffusion supports to the metal core are preferably polymeric binders. Either polytetrafluoroethylene or perfluorosulfonic acids, such as NAFION, or both may be used. NAFION is a trademark of E. I. DuPont de Nemours of Wilmington, Del.

As noted previously, it is important that the gas diffusion structure used with the oxygen electrode be an efficient gas diffuser capable of both delivering oxygen to the electrode without flooding in the fuel cell mode and of supporting an adequate water flux to support electrolysis in the electrolyzer mode. In the present invention, these conditions are met by combining materials to achieve the appropriate balance of hydrophobic and hydrophilic sites. The combination involves treating the metal core to render its surface hydrophobic and bonding the normally hydrophilic gas diffusion supports to the metal core with a small amount of hydrophobic material to partly offset the hydrophilic character of the gas diffusion supports. Rendering the surface of the metal core hydrophobic, by treating it with a fluorocarbon wet-proofing agent, such as FC-722 (from 3M of St. Paul, Minn.), serves to produce water free channels to deliver gas close to the face of the electrode. Reducing, but not fully eliminating the hydrophilicity of the gas diffusion supports, permits the small amount of water needed to support electrolysis (about 0.53 g/l of gas generated) to be delivered to the electrode, while not retaining so much water that the electrode fills with water and floods. This results in the formation of a gas diffusion structure with a random mixture of hydrophilic and hydrophobic regions with dimensions on the micron scale.

Alternatively, the regions of differing hydrophilicity can be regular in structure and arrangement, on a dimensional scale of up to about one millimeter, by distributing the hydrophilic characteristics of the electrode across the surface area of the electrode. Areas of hydrophobic gas diffusion backing are alternated with areas of hydrophilic gas diffusion backing as shown in FIG. 1. This figure shows four patterns potentially useful for producing a spatially heterogeneous hydrophobic-hydrophilic electrode backing. The patterns include, but are not limited to: alternating strips, either vertical as shown or horizontal; hydrophilic spots in a hydrophobic field; hydrophilic squares in a hydrophobic field; and alternating hydrophilic and hydrophobic hexagons. It should be noted that for each pattern, the portion that is hydrophobic can be reversed with the portion that is hydrophilic to produce an inverse, and equally valid pattern.

There are several methods that can be used to fabricate the gas diffusion structures for this type of electrode. For example, bonding alternating strips of hydrophobic and hydrophilic gas diffusion material to a bifunctional, mixed electrocatalyst electrode can produce a striped pattern. Similar methods can be used with either the square or round island patterns and the hexagonal checkerboard. Alternating bands of hydrophobic and hydrophilic gas diffusion material can be deposited onto a common substrate. In another method, the gas diffusion material can also be deposited in other patterns by depositing a hydrophilic gas diffusion material onto the substrate through a stencil or mask. The hydrophobic gas diffusion material can then be deposited through a complementary mask, or simply filled in over those parts of the surface not already covered. Other methods to produce an alternating hydrophilic and hydrophobic pattern may also be used and fall within the scope of the present invention.

To prepare the equimolar ruthenium-iridium oxide electrocatalyst, the classic nitrate fusion synthesis developed by Adams was used. To produce the equimolar ruthenium-iridium oxides in the final catalyst, equimolar amounts of ruthenium and iridium trichloride salts were intimately mixed with a large excess of sodium nitrate and fused. During the process of the fusion, nitrogen dioxide is evolved and the metal oxides are precipitated from the melt. The oxides were recovered from the cooled melt by grinding followed by dissolution of the soluble sodium salts in water. The insoluble oxides were washed with water to remove the chloride ions, which are known to be detrimental to the performance of platinum electrocatalysts.

The preferred oxygen reduction electrocatalyst is platinum black. The concentration of platinum black in the electrocatalyst mixture can range from between about 40 wt % and about 70 wt % platinum black, with the remainder of the electrocatalyst mixture comprising the oxygen evolution electrocatalyst, such as an equimolar mixture of ruthenium-iridium oxides. In the preferred embodiment, a 60 wt % mixture of platinum black was determined to be optimal with the remainder of the electrocatalyst mixture comprising the equimolar ruthenium-iridium oxides.

Optimization of the concentration of platinum black was determined by finding the composition where there is sufficient platinum to support active oxygen reduction without impairing oxygen evolution. Oxygen evolution is the rate limiting step in the operation of an electrolyzer, and oxygen reduction is the rate limiting step in the operation of a fuel cell, so the oxygen electrode sets the limit on performance of the unitized regenerative hydrogen-oxygen fuel cell under most operating conditions. The ruthenium-iridium oxide solid solution component of the electrocatalysts of the preferred embodiment has a higher surface area than the platinum black and, with a lower density, tends to be more active on a mass basis.

The electrocatalyst layer of the oxygen electrode comprises the mixture of platinum black, the equimolar ruthenium-iridium oxides, and a binder. The binder is a fluorinated polymer and more preferably, a fluorinated ionomer. The preferred ionomer is a perfluorinated sulphonic acid polymer, such as NAFION. Alternatively, other binders could be used including polyvinylidene difluoride, polytetrafluoroethylene and sulfonated polytrifluorostyrene, with or without additional substituents.

The quantity of binder in the electrocatalyst layer can be between 30 vol % and 60 vol % binder with optimal results obtained at 40 vol % binder, the remainder being the electrocatalyst mixture including platinum black and the equimolar ruthenium-iridium oxides. The critical factor in determining the amount of binder to use is the binder's electrical and ionic conductivity. The metallic portion of the electrocatalysts is an electronic conductor. The polymeric binder is usually a proton conductor. The oxide portion of the electrocatalysts conducts both protons and electrons. For an electrode to function efficiently, it is important that all of the catalyst particles are in electrical contact with the current collector and in ionic contact with the membrane. Therefore, achieving the optimal amount of polymeric binder requires a balancing of these electrical and ionic conductive properties with an appropriate ratio of components. The present invention achieves the required balance of conductivity with a simple arrangement, with the gross composition used throughout the electrode, and has the further advantage of being simpler to fabricate than those needing a variable internal structure to achieve these properties.

To prepare the actual electrode, measured amounts of iridium-ruthenium oxides and fuel cell grade platinum black were combined. The mixture was used to prepare an ink using a fluoropolymer binding agent. The ink was then used to fabricate an electrode that was attached to one surface of a NAFION membrane. The electrode films are thermally cured by conventional methods. Sufficient ink was used to yield an electrocatalyst loading of 4 $mg/cm^2$ (total metal basis) in the electrocatalyst membrane. Alternatively, the electrocatalyst loading could range from 0.4 $mg/cm^2$ to 10 $mg/cm^2$.

Figure 1A:
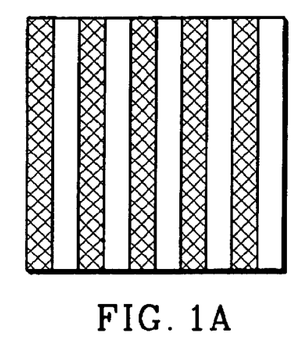
FIG. 1 shows patterns potentially useful for producing a spatially heterogeneous hydrophobic-hydrophilic electrode backing for the oxygen electrode.
Figure 1B:
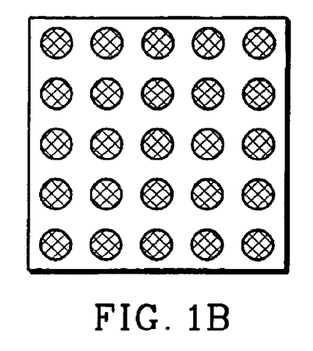
Figure 1C:
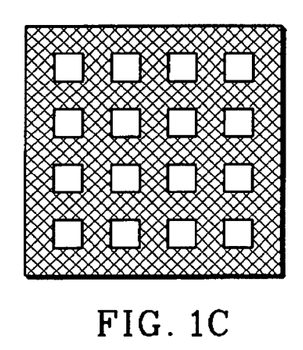
Figure 1D:
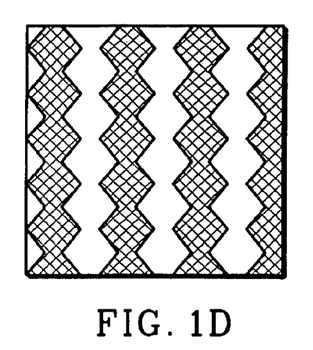
Figure 2:
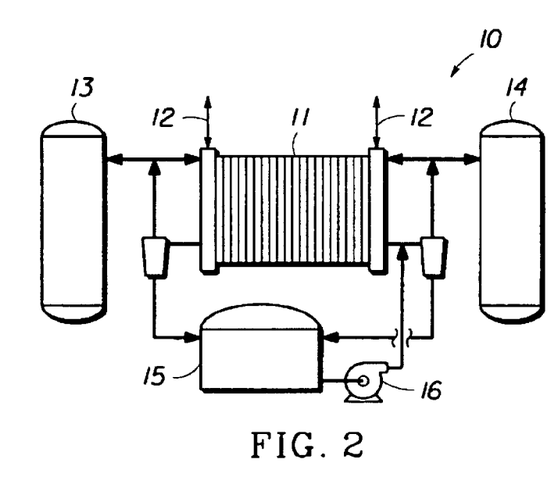
FIG. 2 is a schematic diagram of a unitized regenerative fuel cell.

FIG. 2 is a schematic of a unitized regenerative hydrogen-oxygen fuel cell system 10. The unitized regenerative fuel cell (URFC) stack 11 consists of multiple cells of anode and cathode electrodes, each separated by the solid electrolyte proton exchange membrane (PEM). Multiple cells are used to increase the amount of total power generated or water electrolyzed.

During electrolyzer operation, water stored in a water tank 15 is pumped, via the feed pump 16, to the URFC stack 11. The reactions taking place during the electrolyzer operation, namely water oxidation, oxygen evolution, and hydrogen evolution, generate oxygen gas and hydrogen gas that are stored in the hydrogen tanks 13 and oxygen tanks 14. The URFC is connected to a power source through the electrical power connections 12 to provide the required potential necessary for the electrolysis reactions to occur.

During fuel cell operation, the hydrogen and oxygen that had been produced and stored during the electrolyzer operation are fed to the URFC stack 11. The reactions taking place during the fuel cell operation, namely hydrogen oxidation and oxygen reduction, produce water that is stored in the water storage tank 15. The URFC is connected to a load through the electrical power connections 12, to consume the power produced by the fuel cells.

Figure 3:
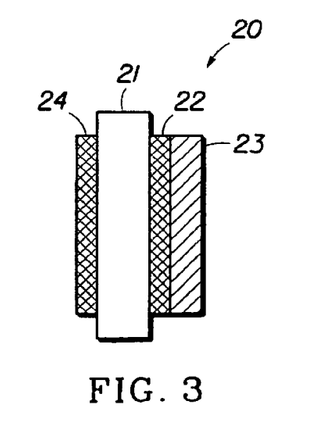
FIG. 3 is a composite diagram of an electrochemical cell.

FIG. 3 shows a schematic cross-sectional diagram of a single regenerative fuel cell 20 in the URFC stack. The proton exchange membrane 21 is the solid electrolyte separating the sides of the cell. The oxygen electrode of the present invention is composed of the electrocatalyst layer 22, made up of the platinum black and the iridium-ruthenium oxides bound with a polymeric binder, and the diffusion backing layer 23 having hydrophobic and hydrophilic regions or passages.

In the preferred embodiment for the unitized regenerative hydrogen-oxygen fuel cell, the electrocatalyst selected for the hydrogen electrode 24, where the hydrogen oxidation and hydrogen evolution reactions occur, is preferably platinum black. At this electrode, hydrogen is evolved as a gas in the electrolyzer operation and consumed as a gas in the fuel cell operation. Any water present is only incidental and not required for the electrochemistry. Actually, while water is necessary to support proton conduction through the membrane, any water present at the surface of the electrode may block mass transfer in the fuel cell mode. Therefore, to support proton conduction through the membrane, it is best to catalyze the interconversion of protons and hydrogen molecules on a hydrophobic gas diffusion hydrogen electrode formulated to repel any water crossing over from the oxygen side or condensing out of the hydrogen gas stream. Platinum black dispersed in a hydrophobic region is therefore the preferred electrocatalyst for the hydrogen electrode. Alternatively, other elements and alloys could be used as the electrocatalyst for the hydrogen electrode; for example, platinum-ruthenium alloy, iridium, iridium alloys, and other platinum alloys, either pure or on an electrically conductive support.

The platinum black in the hydrogen electrode is mixed with a binder. The binder is preferably a fluorinated polymer and more preferably, a fluorinated ionomer such as NAFION. Alternatively, other binders could be used including polyvinylidene difluoride, polytetrafluoroethylene and sulfonated polytrifluorostyrene, with or without additional substituents.

To prepare an actual cell of the unitized regenerative hydrogen-oxygen fuel cell, the same procedure was used as for preparing the oxygen electrode. Then, pure platinum black was applied to the other side of the membrane to make the hydrogen electrode in a similar manner.

EXAMPLE 1

Figure 4:
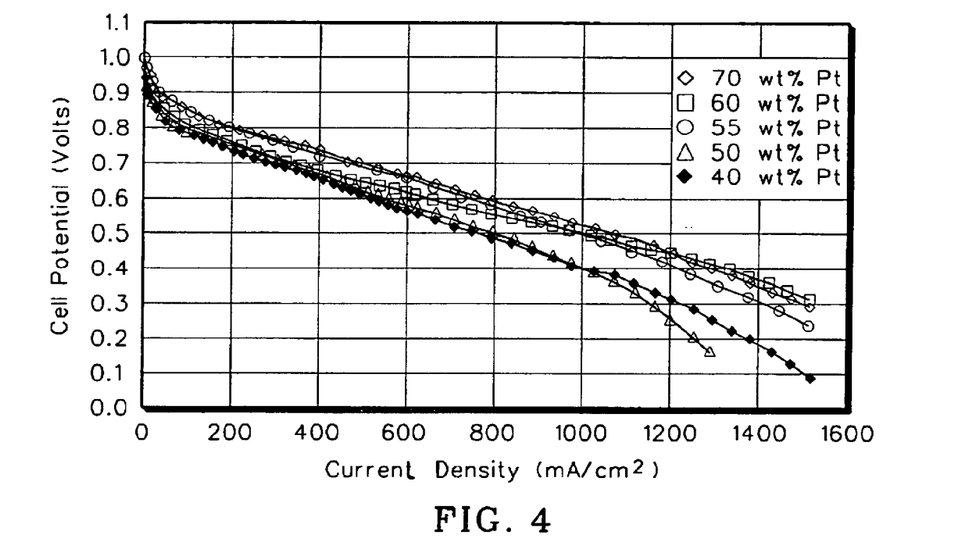
FIG. 4 is a graph showing the effect on fuel cell performance of the ratio of platinum black to ruthenium-iridium oxides in an electrocatalytic mixture.
Figure 5:
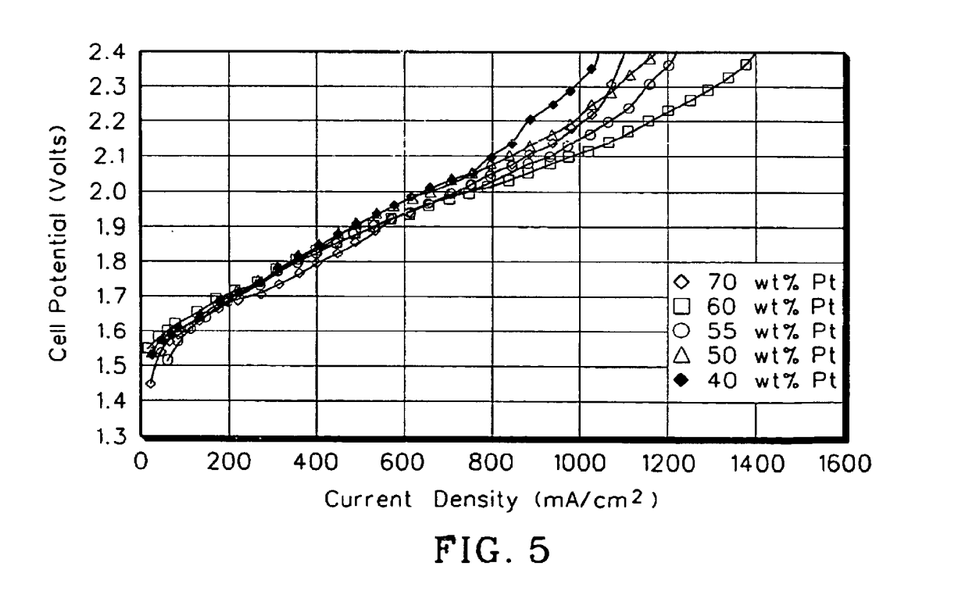
FIG. 5 is a graph showing the effect on electrolyzer performance of the ratio of platinum black to ruthenium-iridium oxides in an electrocatalytic mixture.

To determine the optimal electrocatalyst mixture for an oxygen electrode, several electrodes were prepared and tested using different mixtures of platinum black and equimolar ruthenium-iridium oxides. The amount of platinum black used in the tests ranged from between 70 wt % platinum black and 40 wt % platinum black, the remainder consisting of the equimolar ruthenium-iridium oxide solid solution. The test results are shown in FIGS. 4 and 5.

The ruthenium-iridium oxide solid solution was prepared using the classic nitrate fusion synthesis by Adams. The oxides product of the fusion synthesis was thoroughly washed with water to remove chloride ions, known to be detrimental to the performance of platinum catalysts.

A mass of ruthenium-iridium oxides was combined with a quantity of fuel cell grade platinum black to produce a mixture having the desired weight percent platinum. Five tests were run, each with a different oxygen electrode differing only by the amount of platinum in the electrode's electrocatalyst. The differing amounts of platinum used to fabricate the electrodes were 70, 60, 55, 50, and 40 weight percent platinum, the remainder being the ruthenium-iridium oxides.

The mixture of platinum black and equimolar ruthenium-iridium oxides was used to prepare an ink using a fluoropolymer binding agent. The ink was used to fabricate an oxygen electrode that was attached to one surface of a NAFION membrane. A sufficient amount of ink was used to yield an electrocatalyst loading of 4 $mg/cm^2$ on a total metal basis. The electrode films were thermally cured at 150° C. by heating in a nitrogen-purged oven. Pure platinum black was applied to the other side of the membrane in a similar manner to serve as the hydrogen electrode.

The resulting membrane and electrode assembly was tested and its performance as a fuel cell and as an electrolyzer determined. The results shown in FIG. 4 and FIG. 5 demonstrated that the 60 wt % platinum mixture of electrocatalysts was optimal.

EXAMPLE 2

Figure 6:
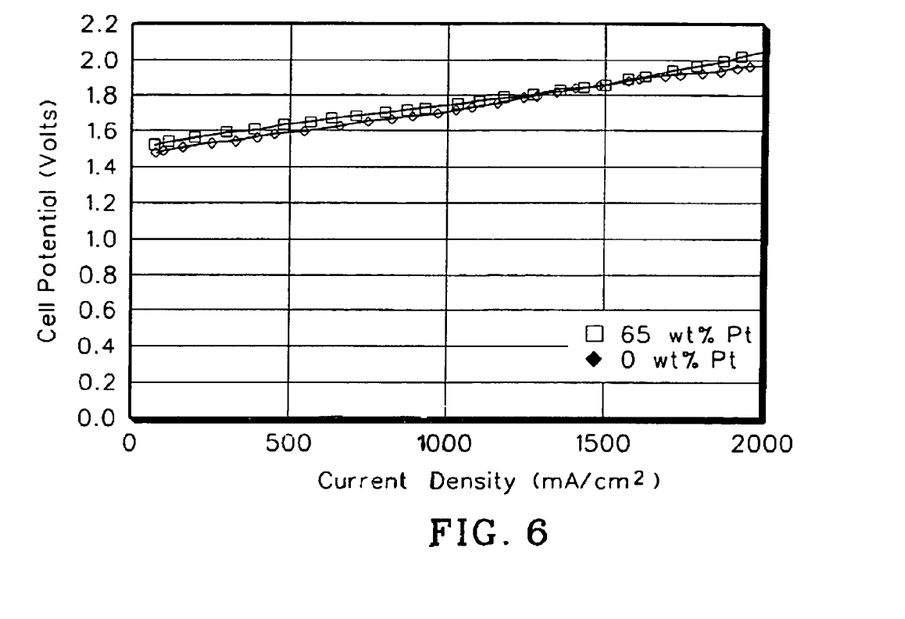
FIG. 6 is a graph comparing electrolyzer performance while using pure ruthenium-iridium oxides as the electrocatalyst and using an electrocatalyst blend of ruthenium-iridium oxides with platinum black.

Using the same procedure as example 1, two oxygen electrodes were assembled and tested for their performance in an electrolyzer mode. As in the first example, only the amount of platinum black in the electrocatalyst mixture was varied. The first oxygen electrode had an electrocatalyst blend of 65 wt % platinum black, the remainder being the equimolar iridium-ruthenium oxides. The second oxygen electrode had an electrocatalyst of pure equimolar ruthenium-iridium oxides and no platinum black. The results, as shown in FIG. 6, demonstrated that the electrolyzer performance of the electrode having the mixed electrocatalyst of platinum black and equimolar ruthenium-iridium oxides performed as well as the electrode having a pure equimolar ruthenium-iridium oxides electrocatalyst.

EXAMPLE 3

Figure 7:
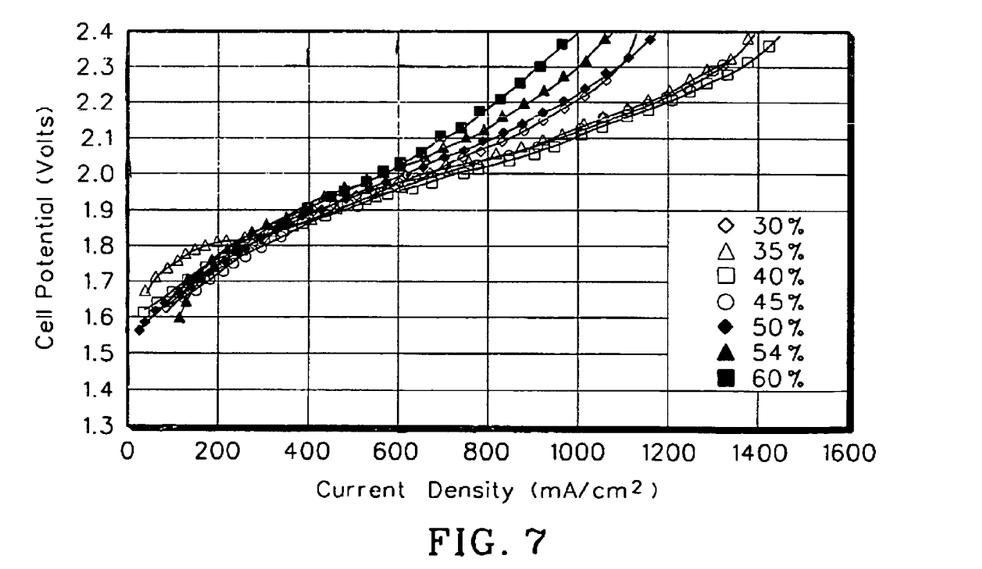
FIG. 7 is a graph showing the effect on electrolyzer performance of altering the volume fraction of electrocatalyst binder in the electrode.
Figure 8:
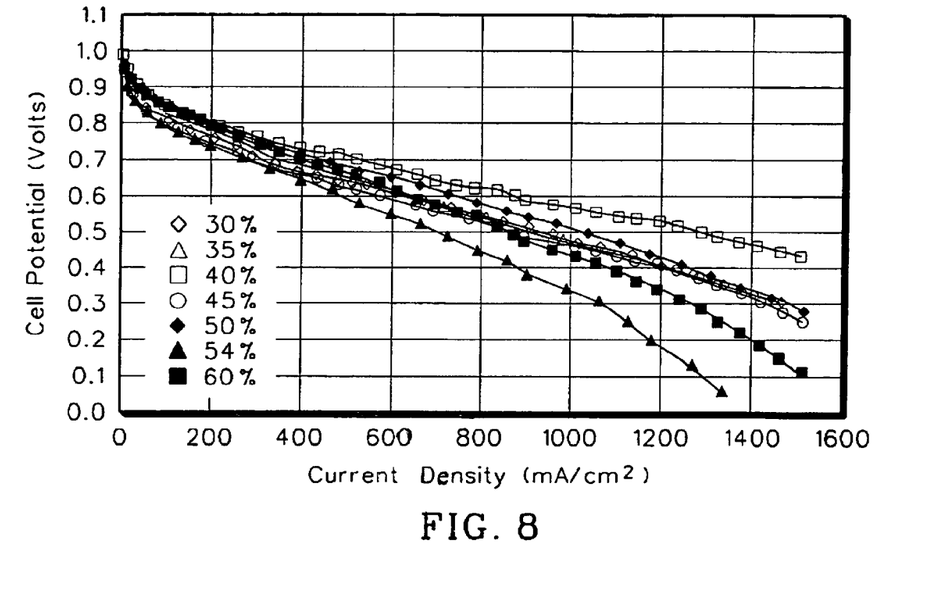
FIG. 8 is a graph showing the effect on fuel cell performance of altering the volume fraction of electrocatalyst binder in the electrode.

To determine the optimal mix of NAFION binder and the electrocatalysts, seven oxygen electrodes were made with varying quantities of NAFION varying from between 30 vol % and 60 vol % NAFION. Using the same procedure to assemble the electrodes as in Example 1, the quantity of NAFION used for the binder was 30, 35, 40, 45, 50, 54, and 60 vol % NAFION, the remainder being an electrocatalyst blend of 60 wt % platinum black and 40 wt % ruthenium-iridium oxides. Each oxygen electrode was placed in a test cell and operated as both a fuel cell and as an electrolyzer cell. The results shown in FIGS. 7 and 8 demonstrated that the mixture having 40 vol % binder was optimal.

EXAMPLE 4

To determine the optimal diffusion backing structure, the effect of three different structures were tested. Following the same procedure as used in Example 1, three oxygen electrodes were assembled with an electrocatalyst mixture of 65 wt % platinum black and 35 wt % ruthenium-iridium oxides bound with 40% NAFION binder. These oxygen electrodes were then combined with three different gas diffusion backings. The first diffusion backing was all metal consisting of gold plated 150-mesh twill weave titanium cloth, made water repellant by treatment with a fluorocarbon wet-proofing agent (FC-722, from 3M, St. Paul, Minn.). The second diffusion backing was identical to the first diffusion backing except that a thin layer (<8 mg/cm$^2$) of polytetrafluoroethylene bonded carbon paste, consisting of a mixture of carbon black (Vulcan XC-72R, Cabot) and conductive carbon fibers, was applied to one face of the woven wire to improve gas diffusion performance. The third diffusion backing was identical to the first diffusion backing except that a thin layer (<15 mg/cm$^2$) of a polytetrafluoroethylene bonded mixed oxide paste was applied to one face of the woven wire to improve gas diffusion performance. The mixed oxides consisted of 60:40 (molar basis) ruthenium-titanium oxides produced using the Adams synthesis.

Figure 9:
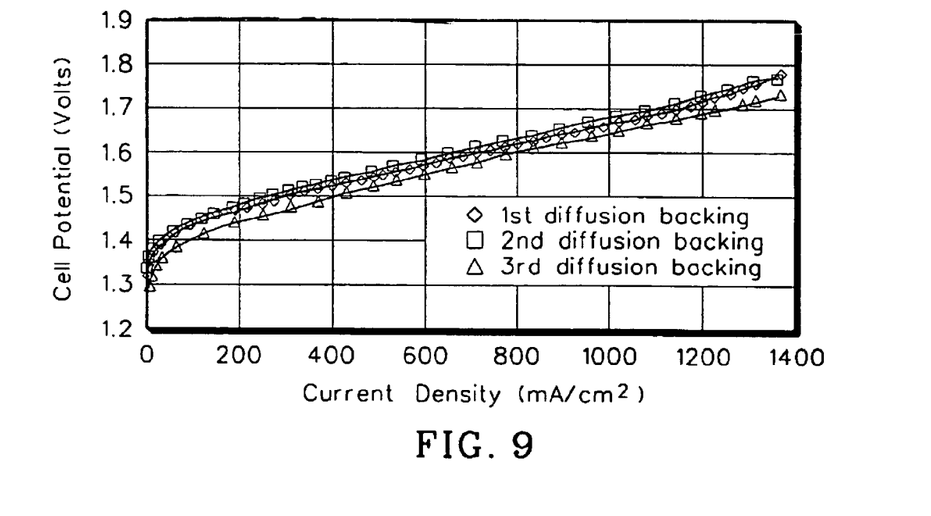
FIG. 9 is a graph showing electrolyzer performance for three different gas diffusers.
Figure 10:
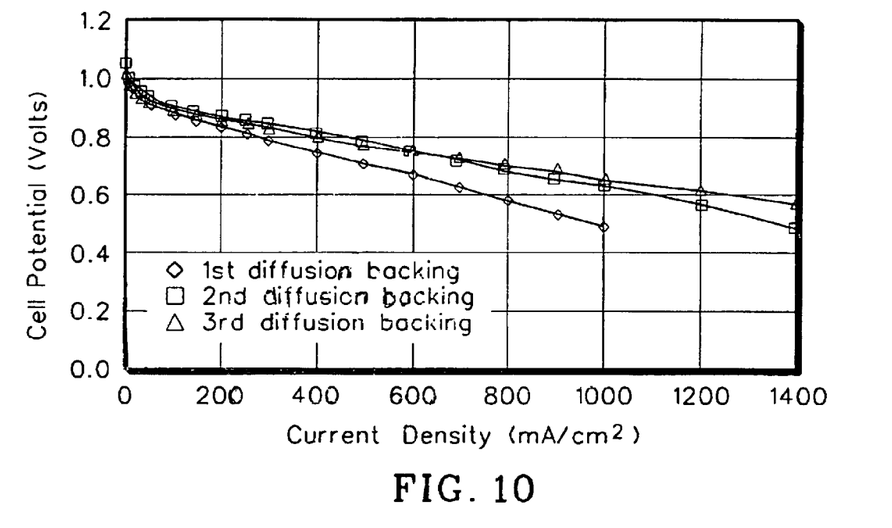
FIG. 10 is a graph showing fuel cell performance for three different gas diffusers

Each diffusion backing was then tested in both electrolyzer and fuel cell operation by placing it against the surface of an oxygen electrode in a cell. The results shown in FIGS. 9 and 10 demonstrated that the gas diffusion backing having the 60:40 ruthenium-titanium oxides bonded to the metal core gave the optimal performance.

While the foregoing is directed to the preferred embodiment of the present invention, other and further embodiments of the invention may be devised without departing from the basic scope thereof, and the scope thereof is determined by the claims that follow.

What is claimed is:

1. An electrode structure for use in a unitized hydrogen-oxygen regenerative fuel cell, the electrode structure comprising:

an electrocatalyst layer comprising a mixture of at least one electrocatalyst active for the evolution of oxygen, at least one electrocatalyst active for the reduction of oxygen, and a binder, and a gas diffusion backing layer having hydrophobic and hydrophilic region on a continuous conductive matrix, wherein the gas diffusion backing layer is in intimate contact with the electrocatalyst layer, wherein the at least one electrocatalyst active for the evolution of oxygen is a solid solution of iridium oxide and ruthenium oxide, wherein the solid solution comprises between about 5 mol % and about 85 mol % ruthenium oxide with the remainder of the solid solution being iridium oxide.

2. The structure of claim 1, wherein the solid solution comprises 50 mol % ruthenium oxide and 50 mol % iridium oxide.

3. An electrode structure for use in a unitized hydrogen-oxygen regenerative fuel cell, the electrode structure comprising:

an electrocatalyst layer comprising a mixture of at least one electrocatalyst active for the evolution of oxygen, at least one electrocatalyst active for the reduction of oxygen, and a binder; and a gas diffusion backing layer having hydrophobic and hydrophilic regions on a continuous conductive matrix, wherein the gas diffusion backing layer is in intimate contact with the electrocatalyst layer, wherein the electrocatalyst active for the reduction of oxygen is an alloy of platinum and another metal selected from the group consisting of ruthenium, iridium, palladium, gold, and cobalt.

4. An electrode structure for use in a unitized hydrogen-oxygen regenerative fuel cell, the electrode structure comprising:

an electrocatalyst layer comprising a mixture of at least one electrocatalyst active for the evolution of oxygen, at least one electrocatalyst active for the reduction of oxygen, and a binder; and a gas diffusion backing layer having hydrophobic and hydrophilic regions on a continuous conductive matrix, wherein the gas diffusion backing layer is in intimate contact with the electrocatalyst layer, wherein the at least one electrocatalyst active for the evolution of oxygen and the at least one electrocatalyst active for the reduction of oxygen is an electrocatalyst mixture comprising between about 40 wt % and about 70 wt % platinum black with the remainder of the mixture being an equimolar ruthenium-iridium oxide solid solution.

5. An electrode structure for use in a unitized hydrogen-oxygen regenerative fuel cell, the electrode structure comprising:

an electrocatalyst layer comprising a mixture of at least one electrocatalyst active for the evolution of oxygen, at least one electrocatalyst active for the reduction of oxygen, and a binder; and a gas diffusion backing layer having hydrophobic and hydrophilic regions on a continuous conductive matrix, wherein the gas diffusion backing layer is in intimate contact with the electrocatalyst layer, wherein the binder as a perfluorosulfonic acid polymer, the electrocatalyst layer comprises about 40 vol % binder blended with the remainder being the at least one electrocatalyst active for the evolution of oxygen and the at least one electrocatalyst active for the reduction of oxygen.

6. An electrode structure for use in a unitized hydrogen-oxygen regenerative fuel cell, the electrode structure comprising:

an electrocatalyst layer comprising a mixture of at least one electrocatalyst active for the evolution of oxygen, at least one electrocatalyst active for the reduction of oxygen, and a binder; and a gas diffusion backing layer having hydrophobic and hydrophilic regions on a continuous conductive matrix, wherein the gas diffusion backing layer is in intimate contact with the electrocatalyst layer, wherein the gas diffusion backing layer further comprises a metal core having gas diffusion supports bonded to the metal core with a binder.

7. The structure of claim 6, wherein the metal core is selected from the group consisting of woven metal cloth, perforated metal sheet, thin metal felts, expanded metal sheet and metal foam.

8. The structure of claim 6, wherein the metal core is plated with a noble metal to prevent formation of an oxide film.

9. The structure of claim 6, wherein the material of the metal core is a metal selected from the group consisting of titanium, zirconium, hafnium, niobium, aluminum, copper, nickel and tantalum.

10. The structure of claim 6, wherein the material of the metal core is selected from oxidation resistant alloys consisting of stainless steels, INCONELS and HASTELLOYS.

11. The structure of claim 6, wherein the material of the metal core is a precious metal selected from the group consisting of platinum, gold, ruthenium, iridium and palladium.

12. The structure of claim 6, wherein gas diffusion supports comprise an electrically conductive compound and a polymeric binder.

13. The structure of claim 12, wherein the polymeric binder is selected from the group consisting of polytetrafluoroethylene, perfluorosulfonic acids or combinations thereof.

14. The structure of claim 12, wherein the electrically conductive compound is a nitride selected from the group consisting of tantalum nitride, zirconium nitride, niobium nitride and titanium nitride.

15. The structure of claim 12, wherein the electrically conductive compound is titanium boride.

16. The structure of claim 12, wherein the electrically conductive compound is titanium carbide.

17. The structure of claim 12, wherein the electrically conductive compound is a ruthenium compound selected from the group consisting of ruthenium oxide and titanium-ruthenium oxide.

18. The structure of claim 12, wherein the electrically conductive compound comprises a solid solution of ruthenium oxide and titanium oxide, wherein the solid solution comprises between about 30 mol % and about 90 mol % ruthenium oxide with the remainder of the solid solution being titanium oxide.

19. The structure of claim 18, wherein the solid solution comprises 60 mol % ruthenium oxide and 40 mol % titanium oxide.

20. The structure of claim 12, wherein the metal core is treated with a fluorocarbon wet proofing agent, the binder is hydrophobic, and the electrically conductive compound is hydrophilic, and wherein the hydrophobic binder decreases the hydrophilic character of the conductive compound, thereby forming the hydrophilic and hydrophobic regions.

21. The structure of claim 20, wherein the hydrophilic and hydrophobic regions are randomly mixed and the regions have dimensions in any direction of about $10^{-6}$ meters.

22. The structure of claim 12, wherein the hydrophilic and hydrophobic regions have dimensions in any direction of about 0.1 mm.

23. The structure of claim 12, wherein the hydrophilic and hydrophobic regions have dimensions in any direction less than 1 mm.

24. The structure of claim 12, wherein the hydrophilic and hydrophobic regions are uniform in thickness and uniform across the surface area in two directions.

25. The structure of claim 12, wherein the hydrophilic and hydrophobic regions are uniform in thickness and uniform across the surface area in at least one direction.

26. The structure of claim 12, wherein the hydrophobic and hydrophilic regions are greater than 1 mm in at least one dimension.

27. A unitized hydrogen-oxygen regenerative fuel cell comprising:

a first electrode structure comprising an electrocatalyst layer and a gas diffusion backing layer, wherein the electrocatalyst layer comprises at least one electrocatalyst active for the evolution of oxygen, at least one electrocatalyst active for the reduction of oxygen, and a binder, and wherein the gas diffusion backing layer comprises hydrophobic and hydrophilic region on a continuous conductive matrix;

an electronically insulating polymer film, having a first side and a second side, capable of exchanging cations with an aqueous solution; and a second electrode structure comprised of an electrocatalyst for the reduction and oxidation of hydrogen, and a binders, wherein the electrocatalyst layer of the first electrode is in intimate contact with the first side of the polymer film and the second electrode structure is in intimate contact with the second side of the polymer film, wherein the at least one electrocatalyst active for the evolution of oxygen is a solid solution of iridium oxide and ruthenium oxide, wherein the solid solution comprises between about 5 mol % and about 85 mol % ruthenium oxide with the remainder of the solid solution being iridium oxide.

28. The unitized regenerative cell of claim 27, wherein the solid solution comprises 50 mol % ruthenium oxide and 50 mol % iridium oxide.

29. A unitized hydrogen-oxygen regenerative fuel cell comprising:

a first electrode structure comprising an electrocatalyst layer and a gas diffusion backing layer, wherein the electrocatalyst layer comprises at least one electrocatalyst active for the evolution of oxygen, at least one electrocatalyst active for the reduction of oxygen, and a binder, and wherein the gas diffusion backing layer comprises hydrophobic and hydrophilic regions on a continuous conductive matrix;

an electronically insulating polymer film, having a first side and a second side, capable of exchanging cations with an aqueous solution; and a second electrode structure comprised of an electrocatalyst for the reduction and oxidation of hydrogen, and a binder, wherein the electrocatalyst layer of the first electrode is in intimate contact with the first side of the polymer film and the second electrode structure is in intimate contact with the second side of the polymer film, wherein the at least one electrocatalyst active for the reduction of oxygen is an alloy of platinum and another metal selected from the group consisting of ruthenium, iridium, palladium, gold, and cobalt.

30. A unitized hydrogen-oxygen regenerative fuel cell comprising;

a first electrode structure comprising an electrocatalyst layer and a gas diffusion backing layer, wherein the electrocatalyst layer comprises at least one electrocatalyst active for the evolution of oxygen, at least one electrocatalyst active for the reduction of oxygen, and a binder, and wherein the gas diffusion backing layer comprises hydrophobic and hydrophilic regions on a continuous conductive matrix;

an electronically insulating polymer film, having a first side and a second side, capable of exchanging cations with an aqueous solution; and a second electrode structure comprised of an electrocatalyst for the reduction and oxidation of hydrogen, and a binder, wherein the electrocatalyst layer of the first electrode is in intimate contact with the first side of the polymer film and the second electrode structure is in intimate contact with the second side of the polymer film, wherein the at least one electrocatalyst active for the evolution of oxygen and the at least one electrocatalyst active for the reduction of oxygen is an electrocatalyst mixture comprising between about 40 wt % and about 70 wt % platinum black with the remainder of the mixture being an equimolar ruthenium-iridium oxides.

31. A unitized hydrogen-oxygen regenerative fuel cell comprising;

a first electrode structure comprising an electrocatalyst layer and a gas diffusion backing layer, wherein the electrocatalyst layer comprises at least one electrocatalyst active for the evolution of oxygen, at least one electrocatalyst active for the reduction of oxygen, and a binder, and wherein the gas diffusion backing layer comprises hydrophobic and hydrophilic regions on a continuous conductive matrix;

an electronically insulating polymer film, having a first side and second side, capable of exchanging cations with an aqueous solution; and a second electrode structure comprised of an electrocatalyst for the reduction and oxidation of hydrogen, and a binder, wherein the electrocatalyst layer of the first electrode is in intimate contact with the first side of the polymer film and the second electrode structure is in intimate contact with the second side of the polymer film, wherein the first electrode structure binder is a perfluorosulfonic acid polymer, the electrocatalyst layer comprises about 40 vol % binder blended with the remainder being the at least one electrocatalyst active for the evolution of oxygen and the at least one electrocatalyst active for the reduction of oxygen.

32. A unitized hydrogen-oxygen regenerative fuel cell comprising:

a first electrode structure comprising an electrocatalyst layer and a gas diffusion backing layer, wherein the electrocatalyst layer comprises at least one electrocatalyst active for the evolution of oxygen, at least one electrocatalyst active for the reduction of oxygen, and a binder, and wherein the gas diffusion backing layer comprises hydrophobic and hydrophilic regions on a continuous conductive matrix;

an electronically insulating polymer film, having a first side and a second side, capable of exchanging cations with an aqueous solution; and a second electrode structure comprised of an electrocatalyst for the reduction and oxidation of hydrogen, and a binder, wherein the electrocatalyst layer of the first electrode is in intimate contact with the first side of the polymer film and the second electrode structure is in intimate contact with the second side of the polymer film, wherein the gas diffusion backing layer further comprises a metal core having gas diffusion supports bonded to the metal core with a binder.

33. The unitized regenerative cell of claim 32, wherein the metal core is selected from the group consisting of woven metal cloth, perforated metal sheet, thin metal felts, expanded metal sheet and metal foam.

34. The unitized regenerative cell of claim 32, wherein the metal core is plated with a noble metal to prevent formation of an oxide film.

35. The unitized regenerative cell of claim 32, wherein the material of the metal core is a metal selected from the group consisting of titanium, zirconium, hafnium, niobium, aluminum, copper, nickel and tantalum.

36. The unitized regenerative cell of claim 32, wherein the material of the metal core is selected from the group of oxidation resistant alloys consisting of stainless steels, INCONELS and HASTELLOYS.

37. The unitized regenerative cell of claim 32, wherein the material of the metal core is a precious metal selected from the group of consisting of platinum, gold, ruthenium, iridium and palladium.

38. The unitized regenerative cell of claim 32, wherein the gas diffusion supports comprise an electrically conductive compound and a polymeric binder.

39. The unitized regenerative cell of claim 38, wherein the polymeric binder is selected from the group consisting of polytetrafluoroethylene, perfluorosulfonic acids or combinations thereof.

40. The unitized regenerative cell of claim 38, wherein the electrically conductive compound is a nitride selected from the group consisting of tantalum nitride, zirconium nitride, niobium nitride and titanium nitride.

41. The unitized regenerative cell of claim 38, wherein the electrically conductive compound is titanium boride.

42. The unitized regenerative cell of claim 38, wherein the electrically conductive compound is titanium carbide.

43. The unitized regenerative cell of claim 38, wherein the electrically conductive compound is selected from the group comprising ruthenium oxide and titanium-ruthenium oxide.

44. The unitized regenerative cell of claim 38, wherein the electrically conductive compound comprises a solid solution of ruthenium oxide and titanium oxide, wherein the solid solution comprises between about 30 mol % and about 90 mol % ruthenium oxide with the remainder of the solid solution being titanium oxide.

45. The unitized regenerative cell of claim 44, wherein the solid solution comprises about 60 mol and about 40 mol % titanium oxide.

46. The unitized regenerative cell of claim 38, wherein the metal core is treated with a fluorocarbon wet proofing agent, the binder is hydrophobic, and the electrically conductive compound is hydrophilic, and wherein the hydrophobic binder decreases the hydrophilic character of the conductive compound, thereby forming the hydrophilic and hydrophobic regions.

47. The unitized regenerative cell of claim 46, wherein the hydrophilic and hydrophobic regions are randomly mixed and the regions have dimensions in any direction of about $10^{-6}$ meters.

48. The unitized regenerative cell of claim 38, wherein the hydrophilic and hydrophobic regions have dimensions in any direction of about 0.1 mm.

49. The unitized regenerative cell of claim 38, wherein the hydrophilic and hydrophobic regions have dimensions in any direction less than 1 mm.

50. The unitized regenerative cell of claim 38, wherein the hydrophilic and hydrophobic regions are uniform in thickness and uniform across the surface area in two directions.

51. The unitized regenerative cell of claim 38, wherein the hydrophilic and hydrophobic regions are uniform in thickness and uniform across the surface area in at least one direction.

52. The unitized regenerative cell of claim 38, wherein the hydrophobic and hydrophilic regions are greater than 1 mm in at least one dimension.

* * * * *